Figure 1:
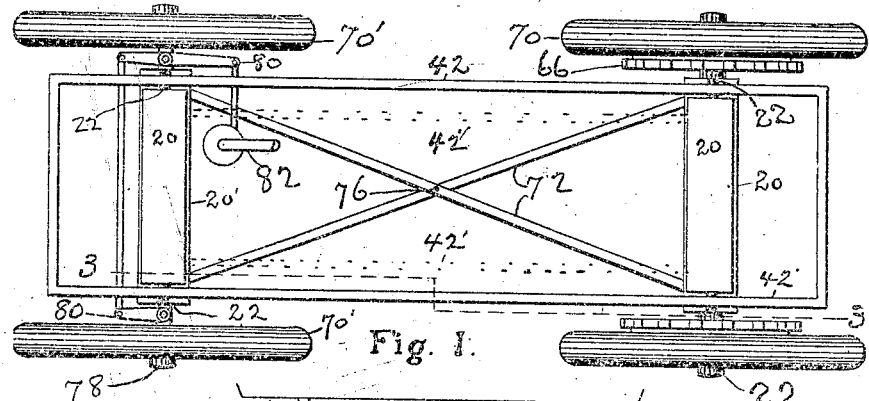

LE VERT CLARK.
AUTOMOBILE.
APPLICATION FILED JULY 26, 1911.

1,111,295. Patented Sept. 22, 1914.

Witnesses.
H. W. Birchfield.
O. B. Brenziger.

Inventor
Le Vert Clark

UNITED STATES PATENT OFFICE.

LE VERT CLARK, OF DETROIT, MICHIGAN.

AUTOMOBILE.

1,111,295.  Specification of Letters Patent.  Patented Sept. 22, 1914.

Application filed July 26, 1911.  Serial No. 640,592.

*To all whom it may concern:*

Be it known that I, LE VERT CLARK, a citizen of the United States, residing at Detroit, in the county of Wayne, State of Michigan, have invented new and useful Improvements in Automobiles; and I do declare the following to be a full, clear, and exact description of the invention, such as will enable others skilled in the art to which it appertains to make and use the same, reference being had to the accompanying drawings, and to the characters of reference marked thereon, which form a part of this specification.
This invention relates to automobiles and particularly to improvements in the chassis or running gear, composed of a truck or trucks having novel internal spring suspension, and parts, co-acting with ordinary vehicle driving and steering mechanisms: and more especially my specific improvement comprising the casing inclosing the spring support, used as a bed plate, base, seat, or place for attaching propelling means to drive the wheels by chain or direct drive to the axle; instead of attaching the motor to the vehicle body, or other portions of the automobile for this purpose, as is commonly done. Of the trucks shown each consists of a set of two wheels, operatively connected, by stub axle and steering knuckles or otherwise, to an axle shaft in a framework designed to support one end of a vehicle body. The present application is for a continuation of or improvement upon my invention described in Patent No. 1,069,228, vehicle; but more simplified and different from it in the way herein described.

The improved unit has no separate and useful functions of its own apart from the vehicle frame; it being merely a component, as a "fifth wheel" when it is used as a necessary element, of the frame. Therefore in the preferred form of chassis it is intended to join only the casing portions of two units by any operable means and then couple the casing of the lower unit to the lower casing of another similar pair of units; the side sills, on which the vehicle-body rests, joining the shafts of the upper units in each pair; which combination constitutes the entire frame of the automobile. Thereby dispensing with the horizontal girders, standards, bearing members, braces, and overhang, essential elements of a different combination, embodied in my Patent No. 1069228, vehicle frame, designed for additional uses (see Fig. 9 of the patent) different from those intended for the present construction. Other improvements, not found in said patent, are in the sub-elements, the suspension spring feature; consisting of shorter reinforcing-springs modifying the action of the other springs, only when the latter are under extraordinary stresses and greatly need assistance, because of rough roads or relatively heavy loads; and also consisting of improved means for coupling the lower casings together; comprising a plurality of triangles with the unit's casing as the third side or base of each triangle. The triangles being connected together by a stiffening countershaft, joined by reaches to another countershaft connected to the other truck member, or directly to the lower casing or shaft of that truck member; together constituting the improved coupling means of the frame; used as a substitute for, or in reinforcing any ordinary reach-poles, when desirable to reinforce them; and for other purposes in the frame, when necessary.

Figure 2:
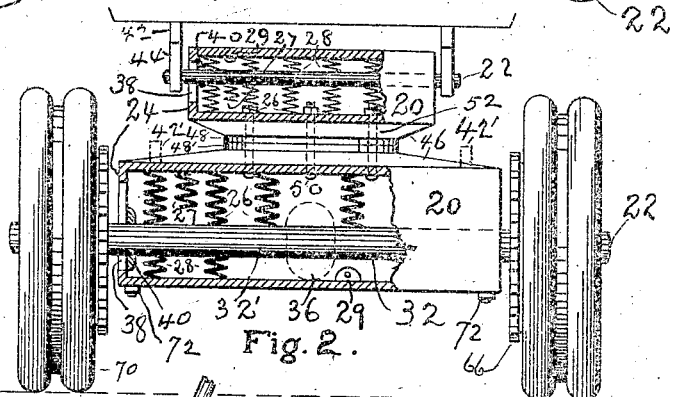
Figure 3:
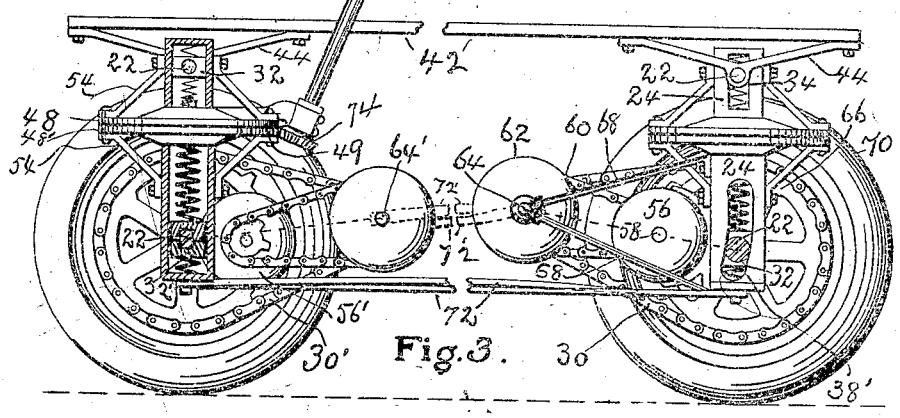

In the drawings: Figure 1 is a plan view of an automobile, embodying this invention; in which the front wheels along at the left, are steered; and ordinary propelling means are operable with the rear wheels at the right of the figure. Fig. 2 is a rear elevation, partly cut away, of Fig. 1; and also of front and rear of Fig. 3. Fig. 3 is a cross-section and end view, on line 3—3 of Fig. 1, of the units in the front and rear truck members respectively; this figure also gives side views of conventional driving motors attached to the lower units, of two similar trucks, shown in elevation in Fig. 2 and plan view at right of Fig. 1, which trucks may be coupled together, and both steered. Showing specifically at the right of said figure my improvement in propelling means, by attaching a conventional motor and co-acting parts to the casing of the lower unit.

Similar numerals refer to similar parts throughout the views.

In each of the figures the units are alike in the possession of the several essential parts; to wit, the casing 20, shaft 22, perforated closures 24, and springs 26, or other resilient elements, which may vary in character, size, number, and degree of elasticity.
26 are called load springs, which are longer and bear the weight of the vehicle and its load; and 28 are shorter springs or merely buffers opposing, to help absorb vibration in the rebound oscillation.

27 and 29 are examples of a shorter auxiliary load spring and a buffer, the latter of rubber, reinforcing the springs 26 and 28 when they are under greater than ordinary stress. The springs may be seated and muffled with soft material (not shown), where there is any tendency to noise in operation. The whole taken collectively, for brevity and convenience of reference, may be termed and treated as a single element of the character described, which I call an "elastic unit". Its casing or housing portion is formed preferably, for this species of automobile, of a somewhat elongated prismatic box-like frame or crate; in which the longitudinal shaft extending therethrough is longer than the casing, for outside operative connections, at each of its ends, with the body, wheels and other suitable parts. In the upper units the shaft does not rotate; nor does it revolve in the lower units when chain drive propulsion 30' is used. In such cases a shaft may be of I-beam construction preferably, or of any other suitable cross-section.

32 is a sleeve which may also be of prismatic or other suitable cross-section to correspond, and is preferably used as a seat for the springs and also for holding the shaft which is easily withdrawn therefrom; though the springs may be mounted directly on the shaft as at 34 in Fig. 3. For convenience a dead shaft may be divided and the parts inserted in each outer end of the adjacent sleeve portions 32 and 32' and bolted or spliced together like a track joint of a railroad, or otherwise, not necessary to illustrate. If it is a live axle the divided parts will connect at the differential in the usual way. Portions of the casing and sleeve may be prepared to be opened as needed to give access to interior parts for repairs and making suitable connections with the shaft or for placing springs and other purposes.

36 shown in dotted lines is the outline of a conventional non-rotating differential housing, otherwise an enlargement of the sleeve 32, containing a direct shaft drive mechanism operatively connected to an inside rotatable shaft, carrying the vehicle wheels 70, which may be used if preferred instead of a dead axle and chain drive, in Figs. 1, 2, and 3. Suitable anti-friction bearings such as are described in my application No. 494,988 or other species may space a rotating shaft and its sleeve in the usual way.

The resilient elements inside the casing support the shaft and are seated preferably on the sleeve, and necessarily so when it encloses a rotatable shaft, to oscillate only in a relation vertical to a horizontal plane in which lies the shaft: for which purpose I preferably employ ordinary spiral bolster springs; but other resilient elements may be used instead, above and below the plane of the shaft.

24 is a closure on the ends of the casing with an elongated opening 38 which may be in the form of an arc in Fig. 3, through which projects the shaft; the elongated opening allows for relative oscillation of the casing and shaft.

40 is a thrust bearing or shoulder sliding on the closure 24 as guides which may be used to prevent side slip. If there is an excess of load or oscillation, the ends of the opening 38 act as stops to save the springs.

The above description is of the elastic unit which forms an integral part of the vehicle itself. One or more of these units may be employed in each front and in each rear truck member. I preferably use two in each truck to obtain greater elasticity in pleasure vehicles, and place the shaft eccentric with the longitudinal axis of the casing by the use of several load or main springs 26 and fewer short buffer springs 28 of any resilient material and shape.

42 is a conventional vehicle body portion connected to the shaft of the upper unit by brackets 44 which are, however, not essential, as the side bar may be directly connected to the shaft without the intervention of brackets. The upper units may be dispensed with and the vehicle body connected to the lower as indicated by the dotted lines 42'. This is suitable for some commercial vehicles swung low to the ground.

46 are in the nature of saddle blocks which, like brackets are used merely to elevate or space the upper from the lower unit as far as desirable, but may preferably be omitted altogether as in Fig. 1.

48 is the upper portion of a conventional fifth wheel attached to the upper unit and 48' the lower portion attached to the lower unit. Concentric therewith is a king-bolt 50 movably attaching together the upper and lower units, which may then be turned laterally in opposite directions upon the axis of the bolt 50 the same as the front truck of an ordinary wagon. But if it is desired to fix temporarily or permanently the upper and lower units, immovable in relation to each other and have the vehicle steer by the front wheels, I use a plurality of easily removable pins or bolts 52 and 52 attaching the units, so as to prevent any lateral revolution on the axis of a central bolt. All of the spacing parts described, between the upper and lower units, may be omitted and the two units directly attached together by their casing portions as stated and a fifth wheel may be placed between them in the same relation and attachable as above described, if so desired. Though the adjacent horizontal surfaces of the units will ordinarily afford a sufficient fifth wheel or turntable in themselves with rolls between (not shown).

54 are braces to stiffen the outer edges of a fifth wheel, of extra large diameter; but the large size is not essential and a smaller may answer the purpose.

To the right of Fig. 3, is a conventional electric motor 56 very firmly attached to the casing of the adjacent unit. Of the coöperating propelling means there shown, which are the only propelling parts specifically claimed as new in this application, the casing 20 is an essential member thereof; and is likewise inseparable from the running gear. It forms the base of the triangle of which the other two sides are the distance rods 68 and 68 in combination therewith, whose functions are hereinafter described. There are two of said triangles supporting the countershaft 64, one at each end of the casing 20. The propelling means shown to the left of Fig. 3, including the motor attached to the axle shaft 22 or sleeve 32' and oscillating therewith, may be such as is commonly used; and is not herein specifically claimed. Together they constitute a "four wheel drive". But the propelling means, to right of Fig. 3, may be used in both forward and rear trucks, or in the rear truck alone to right of Fig. 1. It is also possible to steer only the front wheels including the front axle of Fig. 3, or the front wheels including the axle and stub axles of Fig. 1, but is not so desirable as to steer by its stub axles alone. There is a pinion or sprocket wheel on the far end of the armature axle 58 which co-acts by a chain 60 with a differential gear 62 on the countershaft 64 which also has a sprocket at each of its ends; the one on the far side (the near one being cut off supposedly on line 3—3) co-acts with the driving chain 30 and sprocket 66 to propel the wheels 70. The countershaft is kept its distance away by adjustable radial rods 68 and 68 attached at one end to the adjacent unit casing (or motor casing 56) and the other ends carrying the counter-shaft 64. The edges 38' of the opening in the closure 24 are preferably arcs of two circles concentric with the counter-shaft 64 so that no matter what the oscillation of the axle shaft 22 may be within its limitations, the tension on the chain 30 will remain the same under all conditions because of the rods 68 radial to the shaft 64 and arc 38'. Distance rods not shown may also be used to connect together the countershaft 64 with the axle 22 (or sleeve 32) in the usual way, well known to the art, in a relation parallel to the dotted lines connecting those members, in each truck of Fig. 3. The other motor 56' installed in the front truck to the left of Fig. 3, is likewise very firmly attached to the unit, in this instance, however, to a sleeve portion 32' usually called a housing, inclosing the shaft inside the casing, which is a common method in electric vehicles, instead of being attached to the casing portion of the adjacent unit which is my improved method as shown to the right of Fig. 3. However, in both instances the electric motors are attached firmly to the units and turn laterally with them, if the units turn sidewise, and upon the same vertical axes of the king-bolts 50: both trucks may, by this combination be easily propelled and steered simultaneously. Of course to turn sidewise the radial or distance rods (not shown) in the left of Fig. 3, holding the counter-shaft 64' would have to be attached to the same base (the sleeve 32') as the motor 56' which attachment is well known to the art: chainless or cog wheel motors may be used in the front truck instead. There are many well known methods of installing "power plants" in vehicles to propel them, particularly when the trucks, co-acting with the propelling parts, do not turn laterally on a king-bolt: but as to this I only claim specifically not the motors but the combination embodying any propelling means to drive the vehicle co-acting with an elastic unit as an element or with parts operatively connected to the unit.

72 are rods that couple the front and rear trucks together, preferably in alternate relation so that both truck members may be steered as shown in Fig. 3 by an ordinary steering post and pinion 74 co-acting with gear teeth 49 on the perimeter of the lower portion of the fifth wheel. Instead of coupling the bottoms of front and rear units I may couple in the same alternate relation the ends of the counter-shafts 64 and 64' as shown by the rods in dotted lines 72' which also provides good suspension means for keeping both counter-shafts in proper alinement.

The above is the simplest mode of steering but there are other better methods, not here illustrated, of steering both the trucks; for example, by chains connected to the lower parts of the fifth wheel of either truck or to any suitable lower parts of the truck to right and left of its center and passing the chains, in alternate series around a drum on a counter-shaft having a pinion working with a worm gear on an ordinary steering post (not shown). The coupling rods may be attached together at point of intersection by a bolt 76 or otherwise; which will maintain both front and rear axles shafts parallel with each other at all times until the bolt 76 made to be easily removable is withdrawn or dispensed with, as in Fig. 3; whereby in Fig. 1 the ends of the forward unit may be operatively connected to stub axles 78 and the front wheels 70' alone steered by knuckles 80 rods and the usual steering post 82. Other methods of coupling any two of the trucks of my invention together and steering the vehicle may be provided and found operable as well or may be better than the ways I described and do not claim as new.

I claim as my invention:

1. In an automobile, a unit, having in combination a prismatic casing or housing portion; a shaft extending longitudinally through and longer than the casing so as to allow suitable connections, outside the casing, to be made on each end of the shaft, with parts coöperating therewith; resilient elements called load springs, inside the casing, carrying the weight; opposing elements, on the other side of the shaft, limiting the rebound of shaft and casing when oscillating relatively to each other in an approximately vertical relation and not otherwise oscillatory radial to said shaft; means operatively connecting the casing to the casing of a substantially similar unit in the same vertical plane, forming a truck member; and means to couple said casing to another truck member, having a pair of units in similar relation, in the same vehicle frame; the shafts of the upper units being connected together by sills on which the vehicle-body rests; together constituting the entire vehicle frame.

2. In an automobile, a unit, having in combination a casing; a shaft extending longitudinally through and longer than the casing; resilient members called load springs, inside the casing operatively supporting the weight; resilient auxiliary members modifying and reinforcing the other load springs on the same side of the shaft and operatively assisting in carrying the weight, only when the casing and shaft are under relatively greater stress than ordinary; opposing elements on the other side of the shaft limiting the rebound of shaft and casing when oscillating relatively to each other; and means to operatively connect said unit to other suitable portions of the frame; together constituting integral parts of the running gear.

3. In an automobile, a truck having in combination a unit characterized by having a shaft, of a length approximately the width of the vehicle at the place where used; a casing, somewhat shorter than the shaft, through which the shaft extends normally parallel with the long axis of the casing; closures on the ends of the casing through which the shaft freely protrudes, permitting transverse oscillation relatively between the casing and shaft; springs, inside the casing on one side of the shaft, operative, only vertically in service, between the casing and the horizontal plane in which lies the shaft, resiliently sustaining the weight of the vehicle chassis, body and its load, respectively as may be required; opposing buffers, inside the casing on the other side of the said plane, to counterbalance the springs by lessening the shock on rebound during the oscillation of shaft and casing relatively to each other; means for operatively connecting the casing of the unit to the casing of a substantially similar unit; a pair of vehicle ground wheels operatively connected to said shaft; and vehicle body sills operatively connected to said casing.

4. An automobile having in combination two truck members each having a pair of units in horizontal planes one above the other and operatively connected together; each unit being characterized by having a shaft, of a length approximating the width of the vehicle at the place where used; a casing, somewhat shorter than the shaft, through which the shaft extends normally parallel with the long axis of the casing; closures on the ends of the casing through which the shaft freely protrudes permitting transverse oscillation relatively between the casing and shaft; springs, inside the casing on one side of the shaft, operative, only vertically in service, between the casing and the said plane, in which lies the shaft, resiliently sustaining the weight of the vehicle chassis, body and its load, respectively as may be required; opposing buffers inside the casing on the other side of the plane in which lies the shaft, to counter-balance the springs by lessening the shock on rebound during the oscillation of shaft and casing relatively to each other; means for attaching other coöperative parts of the vehicle to the said unit; a pair of vehicle ground wheels operatively connected to each of the lower shafts; a vehicle body operatively connected to the upper shafts; substantially as described.

5. In an automobile, a truck having in combination an axle shaft; a casing, somewhat shorter than the shaft, through which the shaft extends, normally parallel with the long axis of the casing; means for attaching other coöperating parts of the vehicle to the casing and its shaft respectively; a pair of vehicle ground wheels operatively connected to said shaft; distance rods forming two sides of a triangle of which one side of the casing forms the third side, the base; a plurality of which triangles together provide means for holding a counter-shaft at the apex of the triangle; the countershaft triangles and casing side together constituting coupling members used in joining the truck to another truck in the same frame.

6. In an automobile, the combination of a horizontal shaft operatively carrying vehicle ground wheels; a casing somewhat shorter than, and inclosing, the shaft; closures covering the ends of the casing portion; which closures have oblong openings in the shape of an arc of a circle concentric with a countershaft operatively connected by distance rods attached to the casing, forming two triangles having the casing as their respective bases; the shaft protruding through the openings and oscillating in said arc; and springs inside the casing, supporting the shaft, substantially as described.

7. In an automobile, the combination of a pair of trucks; each truck having two units in horizontal planes one above the other, their casings being operatively connected together; each unit being characterized by having a shaft inside its casing somewhat shorter than the shaft itself; springs inside the casing above the plane in which lies the shaft and opposing buffers inside the casing on the other side of the shaft supporting the shaft; means for operatively connecting the two casings together, in the same truck; ground wheels operatively connected to the lower shafts of each truck; a plurality of coupling members connecting together the truck members; a vehicle body connecting the upper shafts of two trucks.

8. In an automobile, the combination of a pair of steering and driving truck members; each member having two horizontal units in planes one above the other operatively connected together; each unit having a shaft inclosed by a casing somewhat shorter than the shaft; springs inside each casing on one side of the shaft operating vertically to the plane in which lies the shaft; opposing buffers inside the casing on the other side of the shaft; vehicle ground wheels operatively connected to the lower shafts; distance rods connecting a countershaft and the side of the lower casing; which casing forms the third side making the respective bases of the two triangles each of which supports at its apex, one end of the countershaft; and coupling rods connecting the countershaft with the ends of a similar countershaft in the other truck member; substantially as described.

9. In a motor vehicle and the like, a chassis, comprising a plurality of casings, and means for joining said casings together to constitute the frame of the vehicle; in combination with a plurality of co-acting shafts, one of which is placed inside longitudinally of each of said casings transversely of the vehicle.

In testimony whereof, I sign this specification in the presence of two witnesses.

LE VERT CLARK.

Witnesses:
 HENRY A. HARMON,
 WILLIAM K. WILLIAMS.